Patented Apr. 9, 1929.

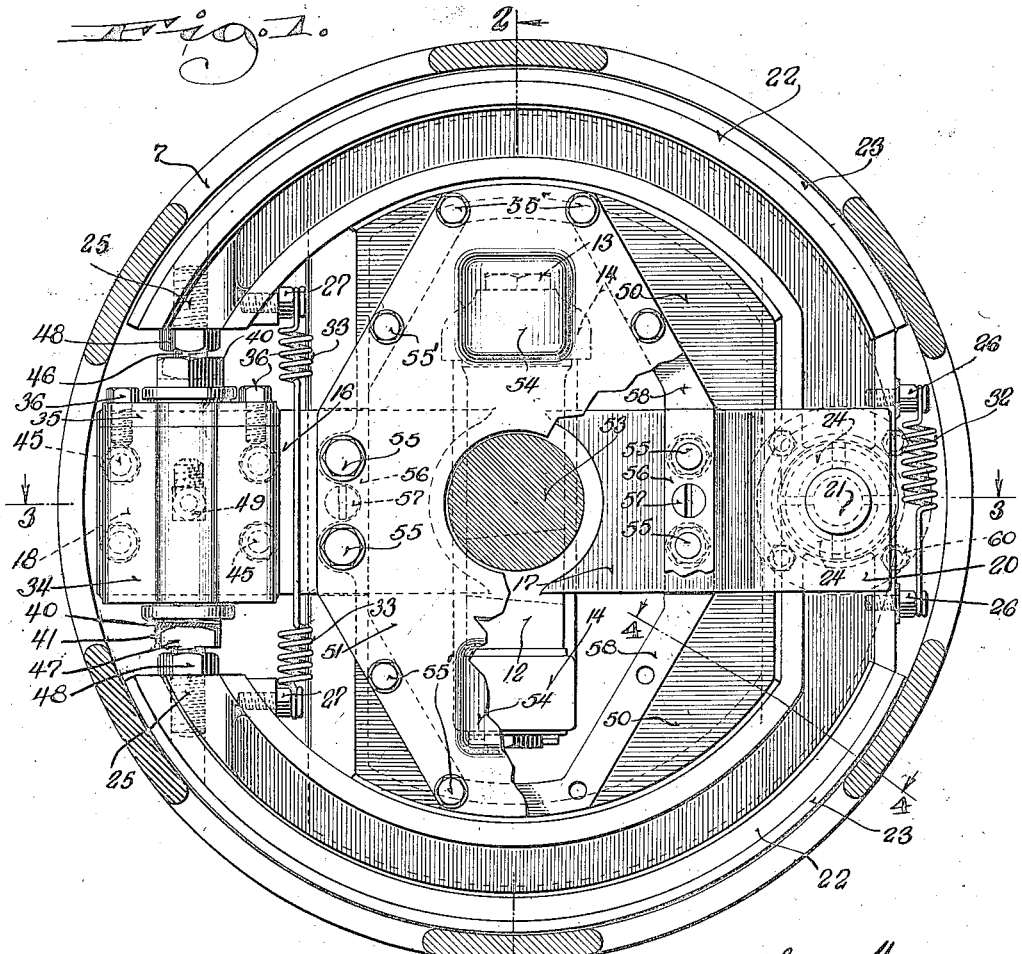

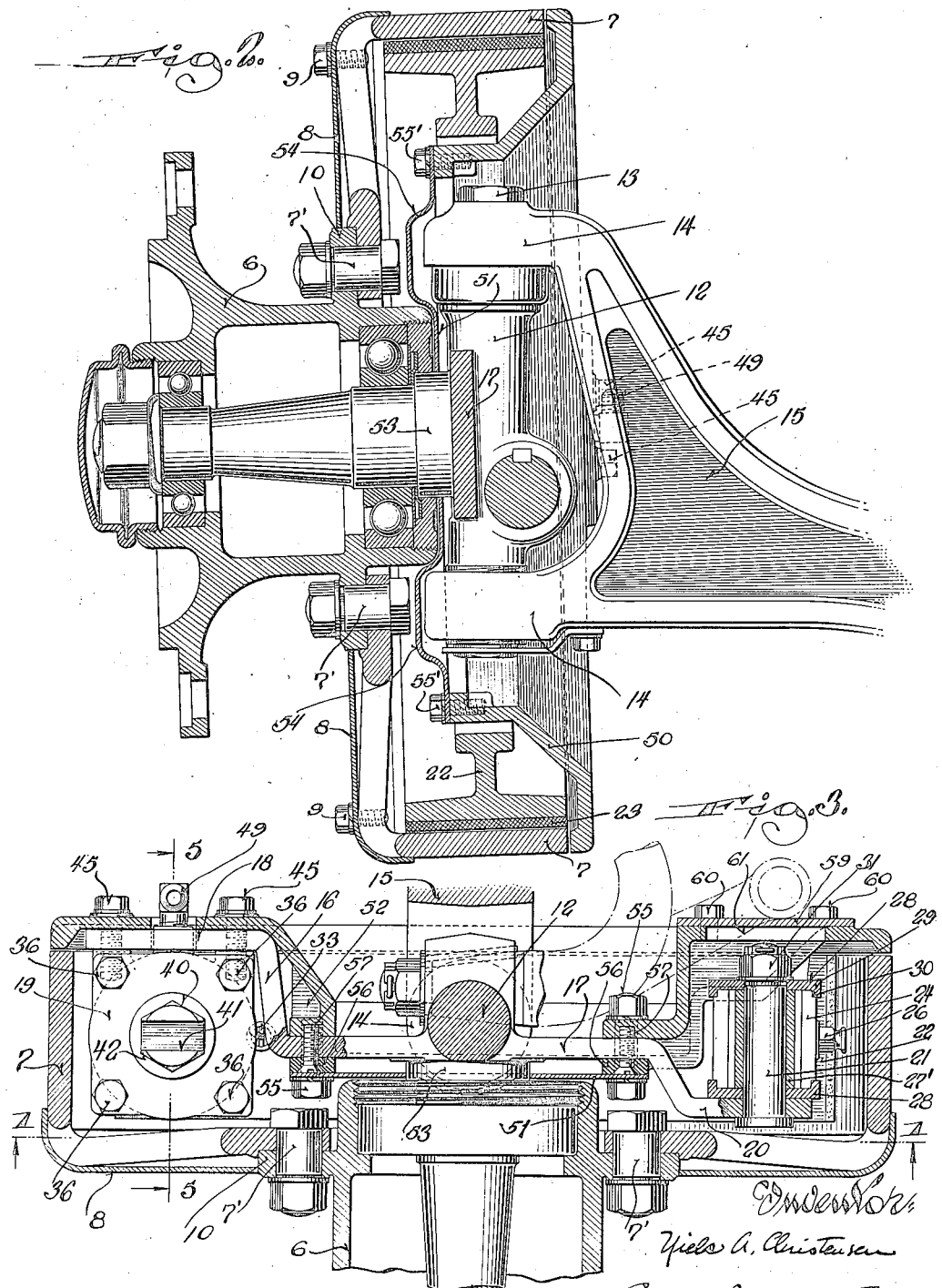

1,708,053

UNITED STATES PATENT OFFICE.

NIELS A. CHRISTENSEN, OF MILWAUKEE, WISCONSIN.

STEERING-WHEEL BRAKE.

Application filed May 7, 1924. Serial No. 711,663.

The invention relates to vehicle brakes, and more particularly to those brakes for use with automotive vehicles and trailers for such vehicles.

The general object of the invention is to provide a fluid-pressure-operated brake mechanism for the dirigible or steering wheel (usually the front wheel) so associated with the steering knuckle and the wheel as to be completely enclosed without interfering with the steering of said wheel.

A further object of the invention is to provide for such an assembly of the brake mechanism and its enclosure as to provide ready access to parts that may need adjustment or inspection.

The invention further consists in the several features hereinafter set forth and more particularly defined by claims at the conclusion hereof.

In the drawings: Fig. 1 is a vertical sectional view taken on the line 1—1 of Fig. 3;

Fig. 2 is a section taken on the line 2—2 of Fig. 1;

Fig. 3 is a section taken on the line 3—3 of Fig. 1;

Fig. 4 is a detail sectional view taken on the line 4—4 of Fig. 1;

Fig. 5 is a detail sectional view through the fluid-pressure-operated motor, taken on the line 5—5 of Fig. 3.

In the drawings the numeral 6 designates the hub of the steering wheel, here shown for a disk wheel though spoked wheels may, of course, be used, and 7 designates a brake-drum secured to the wheel by bolts 7'. As the brake-drum herein shown is of the spoked type, an annular cover plate 8 fits over the spoked portion and is secured thereto by screws 9, said plate extending over the periphery of the drum and fitting tightly around the flange 10 of the hub of the wheel.

The wheel including the hub 6 therefor is mounted on the stub axle of the steering knuckle 12, which is mounted in the usual manner on a pivot member 13 carried by the arms 14 of the supporting axle 15 of the vehicle.

The steering knuckle 12, however, is unusual in that it has arms 16 and 17 formed integral therewith or welded thereto, or otherwise suitably secured, and extending laterally therefrom. The arm 16 has an offset end portion 18 forming a support for the fluid-pressure-operated motor 19, and the arm 17 has an offset portion 20 carrying an anchor pin 21 for the brake members 22 which are provided with suitable brake lining 23. It will be noted that the portion 18 is offset rearwardly while the portion 20 is offset forwardly of the plane of connection between the arms 16 and 17.

In the embodiment here shown the brake is of the shoe type, comprising the brake-shoes 22. Each shoe 22, as shown in Figs. 1 and 3, has a pivot-pin-bearing portion 24 at one end spaced from the adjacent end of the other shoe, and a lug portion 25 at the other end, and carries spring anchor bolts 26 and 27 adjacent its ends. The pin 21 has a spacing bushing 27' thereon which receives the bushed bearing portions 24 of the shoes 22 between bearing washers 28 which have inwardly extending flanges 29 seated in annular recesses 30 in the exterior edges of bearing portions 24, said pin being threaded to receive a nut 31 to hold the parts in assembled relationship and permit a limited pivotal movement of the portions 24 about the bushing 27' and the washers 28. The ends of the shoes formed by the bearing portions 24 are held in operative position against the pivot pin or its bearing by a spring 32 anchored at its ends to bolts 26. Thus, the shoes 22 are free to turn at one end on a pivot carried by the arm 17, more particularly the offset portion 20, so that their free ends may be moved outwardly to bring the shoes into braking engagement with the drum, and said ends are normally held in released position by means of a spring 33 anchored at its ends to the bolts 27.

The fluid-pressure-operated motor 19 is operatively connected to the free ends of the shoes for applying the brake, the preferred form of which is herein shown in detail in Fig. 5. This motor includes a two-part brake-cylinder 34—35 whose parts are secured together by bolts 36, said cylinder having a central port 37 for the inlet and exhaust of pressure fluid. A pair of suitably packed pistons 38 work in the cylinder in opposite directions and have piston rods 39 bolted and pinned or otherwise suitably secured to the heads of said pistons and projecting from the ends of the cylinder. Each piston rod has an enlarged head 40, preferably of polygonal shape, exterior of the brake-cylinder and provided with a groove 41, and a flanged dripwasher 42 abuts against the head to form a water-shed. Each piston is limited in its movement by engagement of the inner head or washer with a shoulder 43 formed by the adjacent end of the cylinder. The brake-cylinder is secured to the offset portion 18 of the arm 16 by bolts 45. A jack-screw 46 is adjustably mounted in a threaded bore provided in the lug portions 25 of the shoes and has a T-shaped or flat-sided head 47 fitting in a slot 41 and cooperating therewith to form a tongue-and-groove connection, said screw being secured in adjusted position by means of a locknut 48. With this construction, when the motive fluid is introduced into the brake-cylinder through the port 37, as by connection of a fitting 49 with the pressure fluid of the system, the pistons will move outwardly and impart a direct thrust to the screws 46 and hence to the shoes with which the screws are connected, thereby bringing the brake into engagement with the drum, and the clearance of the shoes relative to the drum may be readily adjusted by the position of the screw 46 relative to its shoe and the head 40 of the piston which actuates it. Upon release of pressure the brake-shoes return to a position clear of the drum through the agency of the springs 33.

In order to protect the brake mechanism from water and slush which might work in from the open end of the drum, I provide an enclosure consisting of a main covering member 50 and a supplemental cover plate 51, both of which are supported and connected together through their connection with the arms 16 and 17, and in such a manner as to close off the entire exposed side of the brake mechanism. The member 50 is generally annular in form and generally angular in cross-section in order to provide the proper working clearance between the brake mechanism, the supporting axle and the steering gear, and has a base flange 52 secured by bolts 55 to the arms 16 and 17. This covering 50 is preferably of a diameter substantially the same as the diameter of the brake-drum and, as shown, there is merely a working clearance between this flanged covering 50 and the drum. The cover plate 51 centers on the wheel spindle 53 of the steering knuckle and is arranged in a small space between the hub and the shoulder of the wheel spindle with a working clearance for the hub. This plate is preferably flat except for two recessed portions 54 to accommodate the ends 14 of the axle. The plate 51 is secured by the bolts 55 to the arms 16 and 17 and by bolts 55' to the base flange 52 of the cover member 50, and at the points where the plate 50 is connected with the arms 16 and 17 adjacent the hub spacer, blocks 56 are secured by screws 57 to the arms in order to space the back cover plate 51 closely to the wheel hub. These screws 57 also engage in the flange 52 to hold the member 50 until the bolts 55 are put in. The blocks 56 may be of various thicknesses, depending upon the particular wheel and axle construction on which the invention is used. It will be understood that where the base portion of the covering 50 is attached to the arms 16 and 17 that it is recessed in order to bring the rest of its attaching edge 58 flush with the blocks 56 so that the plate 51 fits flat upon the blocks 56 and the edges 58 of the base flange 52.

With this construction the front brake may be readily assembled or disassembled after the wheel to which the brake drum is attached is removed. If it is desired to dismount the brake shoes, this can be done by taking off a small plate 59 fastened by screws 60 to the cover member 50 and covering an opening 61 thereon through which access may be had to the anchor bolt nut 31, and thus the shoes can be moved toward the member 50 a sufficient distance to slip out of the socket, and the shoe can thus be taken out without the necessity of removing the main enclosure casting 50.

Any adjustment of the jack-screws to the brake-cylinders can be made by taking off the disk wheel from its hub, without disturbing any other part of the brake, as there is then space enough to work in, and removal of the cover plate 8 permits access to the adjusting screws between the spokes of the drum. In case a solid drum is used it will be understood that a suitable opening, similar to an opening provided between spokes of the drum herein shown, will be provided for giving access to the adjusting screws and a plate provided for covering that opening whereby the adjustment of the shoes relative to the drum may be readily made.

The spacing blocks 56 are used for aplication of the brake to existing equipment, but such blocks are not necessary where the plate 51 is specially shaped so as to clear the parts of the knuckle and yet be brought flush with the front faces of the laterally extending arms 16 and 17 and with the adjacent edge of the cover member 50.

Any suitable fluid may be used for transmitting pressure such as gas, oil, or other fluid, to operate the motor, but compressed air is the preferred pressure-transmitting medium because of its ease of control, its adaptability for wide range of service, and its practical efficiency even where small leakage may occur in the motor.

I desire it to be understood that this invention is not to be limited to any specific form or arrangement of parts except in so far as such limitations are specified in the claims or necessitated by the prior art.

What I claim as my invention is:

1. In brake mechanism of the class described, the combination with a steering wheel including a hub and the steering knuckle including a wheel spindle, of a brake-drum on said wheel, supporting arms on the steering knuckle, a fluid-pressure-operated brake including a brake member supported on and operated from said arms for engagement with said drum, means within the drum to release said brake member, a covering for the open end of said drum supported on said arms comprising an annular covering member, and a cover plate interposed between the spindle and the wheel hub and secured to said annular member.

2. In brake mechanism of the class described, the combination with a steering wheel including a hub, steering knuckle including a wheel spindle and supporting axle having knuckle-carrying arms, of brake mechanism including a brake-drum carried by the wheel, a pair of laterally extending arms on said steering knuckle, a pair of brake-shoes pivotally mounted on one of said arms, a fluid-pressure-operated motor mounted on the other of said arms and operatively connected to said shoes to move the same into engagement with the drum, means within the drum to release said shoes from engagement with said drum, and a cover plate for the open end of the drum having a main portion extending in front of said shoes and motor and inwardly to said arms and attached thereto, and a supplemental cover plate secured to the first-named cover plate and disposed between the hub of the wheel and the steering knuckle and steering-knuckle-carrying arms of said axle.

3. In brake mechanism of the class described, the combination with a steering wheel including a hub, and steering knuckle including a wheel spindle, of a brake-drum on said wheel, supporting means on the steering knuckle, a fluid-pressure-operated brake carried by said supporting means and movable into braking engagement with said drum, a covering for the open end of said drum carried by said supporting means comprising an annular covering member, and a cover plate interposed between the spindle and the wheel hub and secured to said annular member.

4. In brake mechanism of the class described, the combination with the steering wheel including a hub and steering knuckle including a wheel spindle, of a brake drum on said wheel, supporting arms on said steering knuckle, a fluid-pressure-operated motor carried by one of said arms, a brake member mounted on the other of said arms and operatively connected to said motor and moved thereby into engagement with said drum, means within the drum to release said brake member, spacing members mounted on said arms, a main cover plate for the open end of the drum secured to said arms, and a supplemental cover plate fitting over the wheel spindle behind the hub of the wheel and against said spacing members and secured to said main cover plate.

In testimony whereof, I affix my signature.

NIELS A. CHRISTENSEN.